March 16, 1937.   R. H. DRAEGER   2,073,627
ADJUSTABLE FILM GATE
Filed May 9, 1935
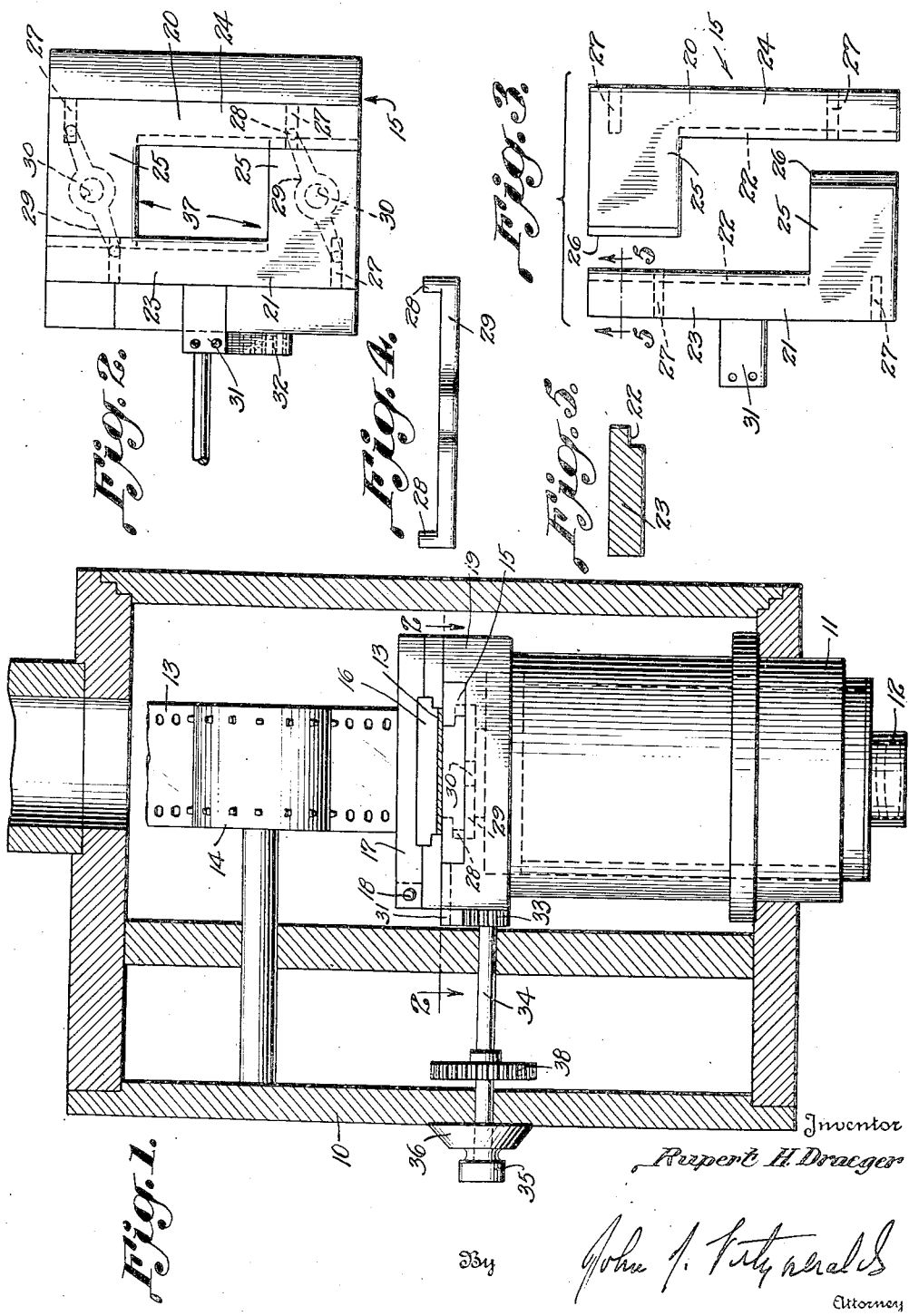
Inventor
Rupert H Draeger
By John J. Fitzgerald
Attorney Patented Mar. 16, 1937

2,073,627

UNITED STATES PATENT OFFICE 2,073,627

ADJUSTABLE FILM GATE

Rupert H. Draeger, United States Navy

Application May 9, 1935, Serial No. 20,612

11 Claims. (Cl. 95—65)

(Granted under the act of March 3, 1883, as amended April 30, 1928; 370 O. G. 757)

This invention relates to an adjustable film gate especially designed for use in copying cameras, projectors, enlargers or the like, wherein varying widths of strip film may be used according to the size of the object that is being copied or photographed.

In copying cameras and the like it is desirable that only that amount of film be exposed as will just hold the image of the object being copied. If more film is exposed it is wasted, and besides, the unnecessary expense of the wasted film has the undesirable feature that the same number of images occupy a greater number of feet of film, thereby unnecessarily increasing the storage and transportation problem thereof.

With this invention it becomes possible to restrict the amount of film that will be exposed as desired, it being intended to restrict the exposed film to a size substantially equal to the image being impressed thereon so as to eliminate or keep to the minimum any wasted areas between successive images.

As a further feature the manual means for adjusting the size of the film gate of this invention may be coupled by a gear train to operate an indexing mechanism which will limit the movement of the film between successive images to an amount just sufficient to carry the successive images without wasting film therebetween, this index feature being shown and claimed in a copending application filed on May 9, 1935, Serial No. 20,613, by the same inventor.

With the foregoing and other objects in view as will hereinafter become apparent, this invention comprises a combination and construction hereinafter disclosed, claimed and illustrated on the accompanying drawing, wherein:

Fig. 1 is a sectional view of a copying camera to which this invention has been applied;

Fig. 2 is a top plan view of the film gate of this invention;

Fig. 3 is a top plan view of the film gate pieces;

Fig. 4 is an end view only of the film gate toggles; and

Fig. 5 is a sectional view of line 5—5 of Fig. 1.

There is shown at 10 a schematic representation of a copying camera or the like having a lens barrel 11 through which extends the lens draw tube 12. Carried in the camera 10 in a conventional manner is the film strip 13 operated by the indexing mechanism 14 operated in a conventional manner or according to the copending manner of the application above referred to. The film strip 13 is held on the film gate 15 by means of the pressure plate 16 secured in the film gate cover 17, which is hinged as at 18 in the usual manner. Secured beneath the film gate cover 17 is the film gate frame 19 in which is located the film gate 15. The film gate 15 includes a film gate piece 20 and the second film gate piece 21. The film gate pieces 20 and 21 are each undercut or slotted as at 22 in other arms 23 and 24, while their short stubs 25 are provided with flat countersunk fingers 26 adapted to fit into the undercut 22 and provide light-tight connection therebetween.

The film gate pieces 20 and 21 are provided on their bottoms with a pair of transverse grooves 27 into which will extend fingers 28 of toggles 29 which are pivoted as at 30 to suitable bosses provided in the film gate frame 19. As a result of the toggle connections 28 and 29 and grooves 27, the linear movement of either film piece 20 or 21 provides a corresponding or opposite linear movement of the other film gate piece.

Secured to one of the film gate pieces as 21 is an extension 31 which rides in a suitably provided slot in the film gate frame 19. Secured to the bottom of this extension 31 is a rack 32 having teeth which will mesh with the spur gear 33 on the end of a shaft 34 extending through the side of the camera 10. Keyed to the end of the shaft 34 is a knob 35 which may be provided, as at 36, with indices for measuring the rotation of the knob 35. As the knob 35 is rotated in one direction it will cause, through its spur gear 33 and the rack 34, the film gate portion 21 to partake of linear movement.

Through the toggle 29 the other film gate portion 20 likewise partakes of the same linear movement but in an opposite direction, thereby changing the length of the aperture 37 formed between the stubs 25. The rotation of the knob 35 in one direction decreases the size of the aperture 37, while rotation in the opposite direction correspondingly increases it within the limits of the length set by the toggles 29 and grooves 27. The length of this distance 37 may be measured by an appropriate indicia placed at 36.

In operation, when a smaller object is being photographed on the film 16, a smaller image may be focused thereon and the aperture 37 will be suitably decreased by proper manipulation of the knob 35. Mounted on the shaft 34 may be a gear 38 which will operate a gear train for controlling the index mechanism 14 according to the invention set forth in the co-pending application above referred to.

The invention described herein may be manufactured and used by or for the Government of the United States of America for governmental purposes without the payment of any royalties thereon or therefor.

I claim:

1. An adjustable two piece film gate providing a complete film gate aperture said pieces being movable parallel to the length of the film gate aperture.

2. A film gate having means for permitting exposures of different lengths and constant width of film and consisting of two film gate pieces providing the complete film gate aperture.

3. A film gate having means for permitting exposures of different lengths of film, and consisting of two film gate pieces in the same plane in cooperative light-tight slidable engagement with each other.

4. A film gate having means for permitting exposures of different lengths of film, and comprising two substantially identical film gate L-shaped pieces in the same plane in cooperative light-tight slidable interfitting engagement with each other, the edge of the horizontal arm of each piece slidably contacting the side of the vertical leg of the other piece to keep the width of the aperture constant while the length may be varied.

5. A film gate having means for permitting exposures of different lengths of film, and consisting of two film gate pieces in the same plane in cooperative light-tight slidable interfitting engagement with each other, and toggle means for causing each of said film gate pieces to partake of the linear movement of the other parallel to the longitudinal side of the film gate and in opposite directions.

6. A film gate having means for permitting exposures of different lengths of film, and comprising two film gate pieces in the same plane in cooperative light-tight slidable interfitting engagement with each other, toggle means causing each of said film gate pieces to partake of the linear movement of the other in opposite directions, and means for moving one of said film gate pieces in a linear direction parallel to the length of the film gate opening.

7. A film gate having means for permitting exposures of different lengths of film, and comprising two film gate L-shaped pieces in the same plane in cooperative light-tight slidable interfitting engagement with each other, the edge of the horizontal arm of each piece slidably contacting the side of the vertical leg of the other piece to keep the width of the aperture constant while the length may be varied, toggle means causing each of said film gate pieces to partake of the linear movement of the other in opposite directions, and means for moving one of said film gate pieces in a linear direction, said means comprising a rack secured to the vertical leg of one of said film gate pieces, a gear meshed with said rack and means for controllably rotating said gear.

8. A film gate having means for permitting exposures of different lengths of film, and comprising two film gate pieces in cooperative light-tight slidable engagement with each other, each of said pieces including a long, narrow portion and a short, wide butt, said long, narrow portion having an undercut and said short, wide butt having a countersink, the undercut of the long, narrow piece cooperating with the countersink of the short, wide butt of the other film gate to provide the slidable light-tight connection therebetween.

9. A film gate having means for permitting exposures of different lengths of film and comprising two film gate L-shaped pieces in the same plane forming a complete aperture and in slidable interfitting engagement with each other, the edge of the horizontal arm of each piece slidably contacting with the side of the vertical leg of the other piece whereby the width of the aperture remains constant while the length may be varied.

10. A film gate having means for permitting exposures of different lengths of film and at the same time permitting a predetermined width of film to be exposed, and comprising two film gate L-shaped pieces in cooperative light-tight slidable engagement with each other, the edge of the horizontal arm of each L-shaped piece sliding along the vertical leg of the other piece.

11. An adjustable film gate comprising two L-shaped pieces mounted in the same plane so as to form a rectangular aperture and means for moving said pieces uniformly in opposite directions so that the centerline of the aperture of said film gate remains fixed irrespective of variations in the size of the aperture as the film gate is adjusted.

RUPERT H. DRAEGER.